(12) United States Patent
Kwon et al.

(10) Patent No.: US 11,964,635 B2
(45) Date of Patent: Apr. 23, 2024

(54) VEHICLE AND VEHICLE WIPER WITH ANTENNA

(71) Applicants: HYUNDAI MOTOR COMPANY, Seoul (KR); KIA CORPORATION, Seoul (KR)

(72) Inventors: Ohyun Kwon, Gyeonggi-do (KR); Sang Heun Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 4 days.

(21) Appl. No.: 17/848,641

(22) Filed: Jun. 24, 2022

(65) Prior Publication Data

US 2023/0095806 A1 Mar. 30, 2023

(30) Foreign Application Priority Data

Sep. 17, 2021 (KR) .......... 10-2021-0124914

(51) Int. Cl.
*B60S 1/04* (2006.01)
*H01Q 1/32* (2006.01)
*H01Q 13/18* (2006.01)
*H01Q 21/08* (2006.01)

(52) U.S. Cl.
CPC .......... *B60S 1/0491* (2013.01); *H01Q 1/3291* (2013.01); *H01Q 13/18* (2013.01); *H01Q 21/08* (2013.01)

(58) Field of Classification Search
CPC .... H01Q 1/3291; H01Q 1/3429; H01Q 13/18; H01Q 21/0043; H01Q 21/08; B60S 1/0491
See application file for complete search history.

(56) References Cited

U.S. PATENT DOCUMENTS

| | | | | |
|---|---|---|---|---|
| 4,554,493 | A * | 11/1985 | Armstrong | B60S 1/0822 318/483 |
| 5,780,719 | A * | 7/1998 | VanDam | B60S 1/0818 318/483 |
| 5,861,857 | A * | 1/1999 | Kozak | H01Q 1/325 343/711 |
| 2002/0020034 | A1* | 2/2002 | Choi | B60S 1/34 15/250.352 |
| 2017/0025015 | A1* | 1/2017 | Thompson | G08G 1/166 |
| 2020/0112087 | A1* | 4/2020 | Kulkarni | H04B 7/0639 |
| 2021/0179296 | A1* | 6/2021 | Jha | B64F 5/60 |
| 2023/0095806 | A1* | 3/2023 | Kwon | H01Q 1/3291 343/713 |

* cited by examiner

*Primary Examiner* — Jason M Crawford
(74) *Attorney, Agent, or Firm* — Morgan, Lewis & Bockius LLP

(57) ABSTRACT

A vehicle and vehicle wiper with antenna is directed to improve communication stability with other target vehicles by securing sufficient signal reception sensitivity of an antenna of a vehicle even in rainy weather where the signal reception sensitivity of the antenna may decrease, while at the same time supplementing shortcomings of a short communication distance. A vehicle includes a wiper including a blade for wiping a windshield of the vehicle and an arm for supporting the blade, and a first antenna provided on the arm of the wiper.

16 Claims, 5 Drawing Sheets

VEHICLE AND VEHICLE WIPER WITH ANTENNA

CROSS-REFERENCE TO RELATED APPLICATION(S)

The present application claims priority to Korean Patent Application No. 10-2021-0124914, filed on Sep. 17, 2021 the entire contents of which is incorporated herein for all purposes by this reference.

BACKGROUND OF THE PRESENT DISCLOSURE

Field of the Present Disclosure

The present disclosure relates to a vehicle, and more specifically, to an antenna structure for improving communication performance of the vehicle.

Description of Related Art

Antenna of a vehicle may be provided in various forms depending on its purpose and use. For example, a rod antenna, a shark fin antenna, and a hot wire antenna may be used. Furthermore, in the case of the shark pin antenna, a plurality of antennae for transmitting and receiving a plurality of different types of signals may be mounted in the internal space thereof. A multi-band antenna for transmitting and receiving a plurality of different signals with one antenna may also be used.

In terms of autonomous driving and connected cars, one of the important core technologies is a high-speed communication and a large-capacity communication. A Millimeter wave communication is essential for the high-speed communication and the large-capacity communication. Due to a short communication distance of the millimeter wave communication, to be used as a communication system for most vehicles that communicate while traveling, it is necessary to secure sufficient signal reception sensitivity to improve communication stability with other target vehicles and to compensate for shortcomings of the short communication distance.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to improve communication stability with other target vehicles by securing sufficient signal reception sensitivity of an antenna of a vehicle even in rainy weather where the signal reception sensitivity of the antenna may decrease, while at the same time supplementing shortcomings of a short communication distance.

Additional aspects of the present disclosure will be set forth in part in the description which follows, and in part, will be obvious from the description, or may be learned by practice of the present disclosure.

In accordance with an aspect of the present disclosure, a vehicle includes a wiper including a blade configured to wipe a windshield of the vehicle and an arm configured to support the blade, and a first antenna provided on the arm of the wiper.

The first antenna may be a directional antenna configured to secure signal reception sensitivity in a same direction as a longitudinal direction of the vehicle toward in front of the vehicle.

The first antenna may be configured in a form of a waveguide including a cross-section, an H-plane, and an E-plane.

A plurality of slots may be formed on the H-plane of the first antenna.

A size of each of the slots and a spacing between adjacent slots among the slots may be ½ of a wavelength (λ) of a signal to be received through the first antenna; and a distance between a central point of a first slot disposed adjacent to one end portion of the first antenna among the plurality of slots and the one end portion of the first antenna may be ¼ of the wavelength (λ).

The vehicle may further include a second antenna provided at a rear of the vehicle.

The first antenna and the second antenna may be for Vehicle to Everything (V2X) communication.

In accordance with another aspect of the present disclosure, a vehicle includes a wiper including a blade configured to wipe a windshield of the vehicle and an arm supporting the blade; a first antenna provided on the arm of the wiper; and a second antenna provided at a rear of the vehicle.

The first antenna may be a directional antenna configured to secure signal reception sensitivity in a same direction as a longitudinal direction of the vehicle toward in front of the vehicle.

The first antenna may be configured in a form of a waveguide including a cross-section, an H-plane, and an E-plane.

A plurality of slots may be formed on the H-plane of the first antenna.

A size of each of the slots and a spacing between adjacent slots among the slots may be formed as ½ of a wavelength (λ) of a signal to be received through the first antenna; and a distance between a central point of a first slot disposed adjacent to one end portion of the first antenna among the plurality of slots and the one end portion of the first antenna may be formed as ¼ of the wavelength (λ).

The first antenna and the second antenna may be for V2X communication.

In accordance with another aspect of the present disclosure, a wiper for a vehicle includes a blade configured to wipe a windshield of the vehicle; an arm supporting the blade; and an antenna provided on the arm of the wiper.

The antenna may be a directional antenna configured to secure signal reception sensitivity in a same direction as a longitudinal direction of the vehicle toward in front of the vehicle.

The antenna may be configured in a form of a waveguide including a cross-section, an H-plane, and an E-plane.

A plurality of slots may be formed on the H-plane of the antenna.

A size of each of the slots and a spacing between adjacent slots among the slots are ½ of a wavelength (λ) of a signal to be received through the antenna; and a distance between a central point of a first slot adjacent to one end portion of the antenna among the plurality of slots and the one end portion of the antenna is ¼ of the wavelength (λ).

The antenna may be for Vehicle to Everything (V2X) communication.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
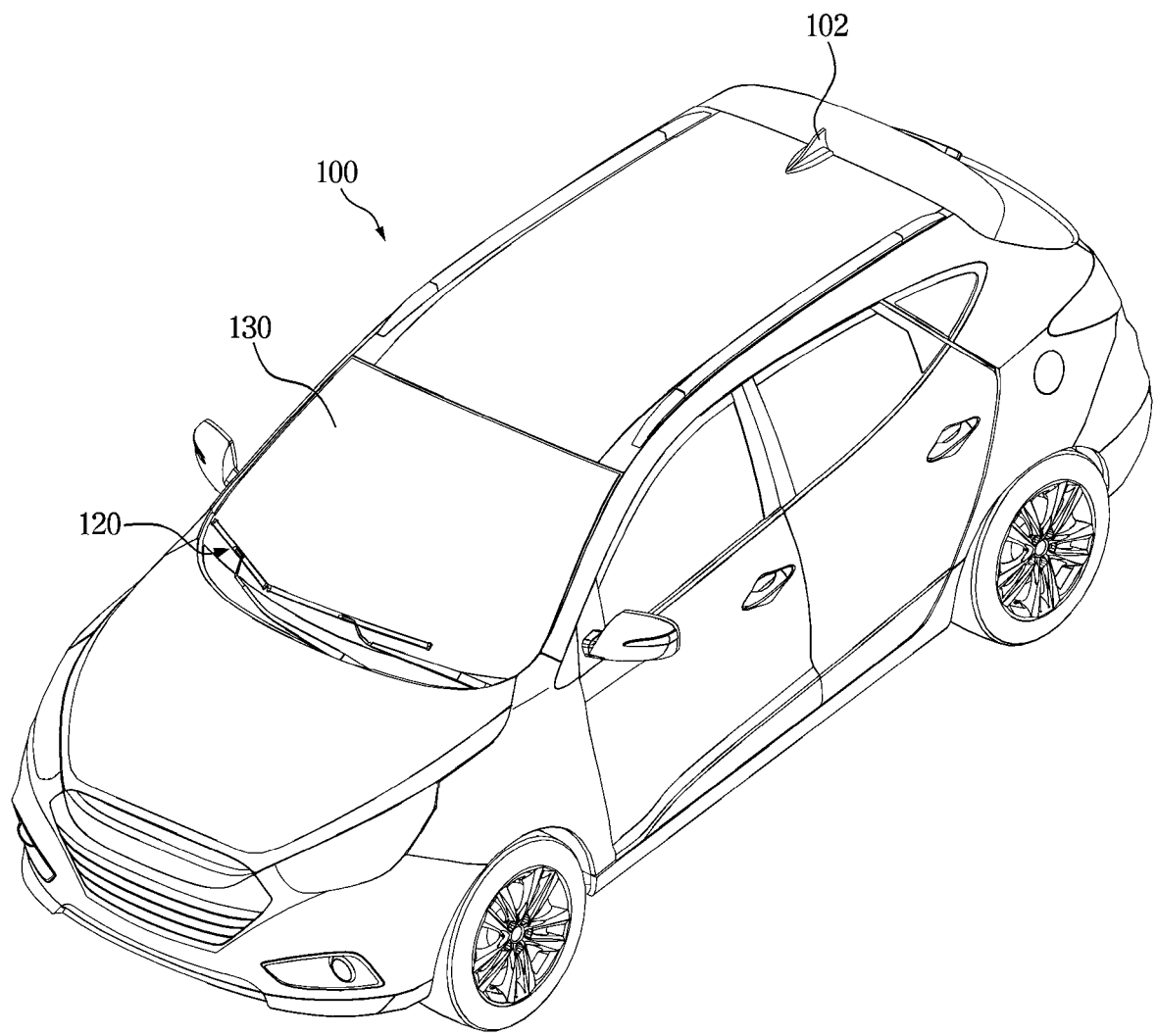
FIG. 1 is an illustrative view showing a vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinbelow, various exemplary embodiments of the present disclosure will be described in detail with reference to the accompanying drawings. While the present disclosure will be described in conjunction with exemplary embodiments thereof, it is to be understood that the following description is not intended to limit the present disclosure to those exemplary embodiments of the present disclosure. On the other hand, the description is directed to cover not only the exemplary embodiments of the present disclosure, but also various alternatives, modifications, equivalents, and other embodiments which may be included within the spirit and scope of the present disclosure as embodied by the appended claims. Throughout the drawings, the same reference numerals will refer to the same or like parts.

FIG. 1 is an illustrative view showing a vehicle according to an exemplary embodiment of the present disclosure.

As shown in FIG. 1, in a vehicle 100 according to the exemplary embodiment of the present disclosure, a first antenna (see FIG. 2 and FIG. 3) is provided on a front wiper 120 of the vehicle, and a second antenna (see FIG. 2 and FIG. 3) 102 is provided on a rear roof of the vehicle. The wiper 120 may be provided to remove rainwater or pollution from a surface of a windshield 130 of the vehicle 100. The first antenna and the second antenna 102 provided in the vehicle 100 according to the exemplary embodiment of the present disclosure may be diversity antennae for a Vehicle to Everything (V2X) communication.

The V2X communication refers to vehicle to everything and may be interpreted as a communication between vehicles and things (or people). The V2X communication is a technology in which the vehicle 100 on traveling exchanges and shares road infrastructures, traffic information, and pedestrian information through a wireless communication. The V2X communication is implemented around vehicles such as a Vehicle to Infrastructure (V2I), a Vehicle to Vehicle (V2V), and a Vehicle to Pedestrian (V2P), etc.

In the vehicle 100 according to an exemplary embodiment of the present disclosure, information regarding a surrounding situation of the vehicle 100 is exchanged through the V2X communication with a nearby V2X base station, other vehicles, or mobile devices of pedestrians. To the present end, the vehicle 100 according to an exemplary embodiment of the present disclosure performs the V2I communication with the V2X base station, performs the V2V communication with another vehicle, and performs the V2P communication with a pedestrian. The V2P communication, strictly speaking, is communication with a mobile device carried by the pedestrian, rather than communication with the pedestrian.

The vehicle 100 performs a two-way communication to generate a safer and more comfortable driving environment by exchanging information with each other through the V2I communication, the V2V communication, and the V2P communication.

The structure of the first antenna provided inside the wiper 120 of the vehicle 100 according to an exemplary embodiment of the present disclosure will be described in detail with reference to FIG. 2 and FIG. 3 to be described later.

Figure 2:
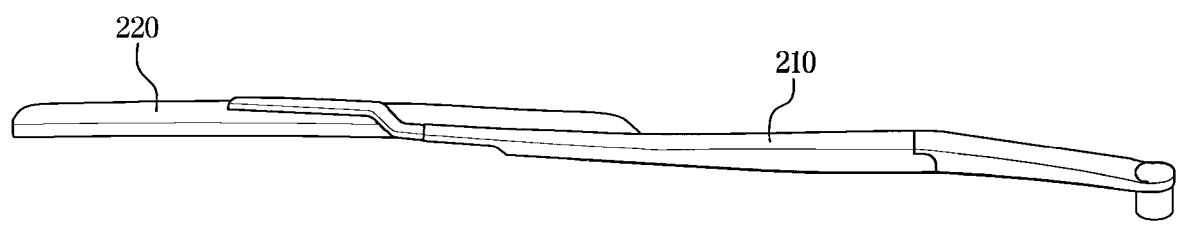
FIG. 2 is an illustrative view showing a wiper of a vehicle according to an exemplary embodiment of the present disclosure.

FIG. 2 is an illustrative view showing a wiper of a vehicle according to an exemplary embodiment of the present disclosure.

As shown in FIG. 2, the wiper 120 provided in the vehicle 100 according to the exemplary embodiment of the present disclosure includes an arm 210 and a blade 220. The arm 210 is mechanically connected to a rotation shaft of a wiper driving motor of the vehicle 100 to rotate within a predetermined angular range, so that the blade 220 reciprocates within a certain range while in close contact with the surface of the windshield 130. The blade 220 removes rainwater or pollution on the surface of the windshield 130 through a reciprocating motion.

The wiper 120 of the vehicle 100 according to an exemplary embodiment of the present disclosure has a structure in which a part or the whole of the arm 210 is configured with the first antenna, or the first antenna may be embedded in the arm 210. The structure of the first antenna provided in the wiper 120 of the vehicle 100 according to the exemplary embodiment of the present disclosure is shown in FIG. 3.

Figure 3A:
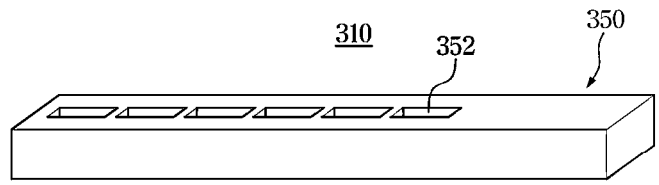
FIG. 3A, FIG. 3B and FIG. 3C are illustrative views showing a structure of a first antenna provided on a wiper of a vehicle according to an exemplary embodiment of the present disclosure.
Figure 3B:
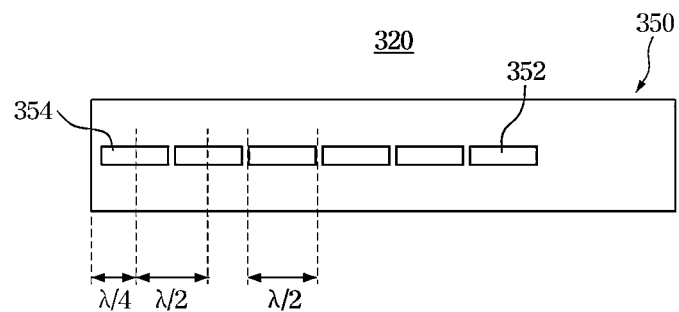
Figure 3C:
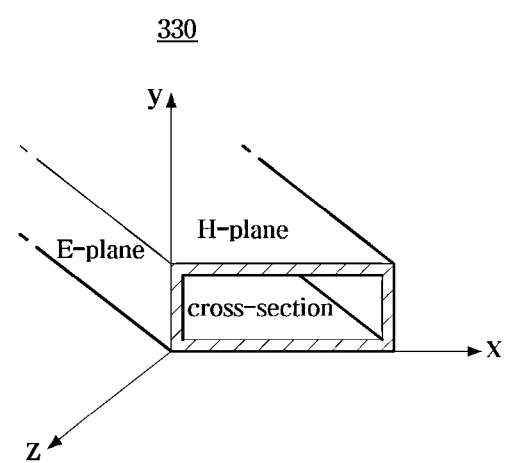

FIG. 3A, FIG. 3B and FIG. 3C are illustrative views showing a structure of a first antenna provided on a wiper of a vehicle according to an exemplary embodiment of the present disclosure. In FIG. 3A, FIG. 3B and FIG. 3C, reference numeral 310 is a perspective view of the first antenna 350 according to an exemplary embodiment of the present disclosure, reference numeral 320 is a plan view, and reference numeral 330 is a cross-sectional view. Accordingly, the first antenna 350 may be formed as a part or the whole of the arm 210 of the wiper 120, or may be provided inside the arm 210 of the wiper 120.

As shown in FIG. 2 described above, the arm 210 of the wiper 120 has a structure similar to that of a waveguide. Accordingly, as shown in FIG. 3A, FIG. 3B and FIG. 3C, the first antenna 350, which is a waveguide type array antenna according to an exemplary embodiment of the present disclosure, may be easily realized on the arm 210 of the wiper 120. As indicated by reference numeral 330 of FIG. 3A, FIG. 3B and FIG. 3C, the first antenna 350 according to the exemplary embodiment of the present disclosure is formed in a form of a waveguide including a cross-section, an H-plane, and an E-plane.

When the arm 210 of the wiper 120 is manufactured, the first antenna 350, which is a waveguide type array antenna, may be implemented through heat treatment processing after producing the arm 210 of the wiper 120 through pressing and bending.

A plurality of slots 352 for receiving radio waves are provided in the first antenna 350. The plurality of slots 352 of the first antenna 350 may be produced through cutting (e.g., laser cutting). The size and spacing of each of the slots 352 formed in the first antenna 350 according to an exemplary embodiment of the present disclosure, as indicated by reference numeral 330 of FIG. 3A, FIG. 3B and FIG. 3C, may be formed with a size and spacing corresponding to ½ (i.e., λ/2) of the wavelength λ of the frequency (e.g., 5.9 GHz). However, as indicated by reference numeral 320 of FIG. 3A, FIG. 3B and FIG. 3C, the distance between one end portion of the first antenna 350 and a central point of the first slot 354 in contact with the one end portion thereof may be formed as λ/4.

The first antenna 350 according to an exemplary embodiment of the present disclosure may be a directional antenna for securing signal reception sensitivity in the same direction as a longitudinal direction of the vehicle toward a front side of the vehicle 100.

Figure 4A:
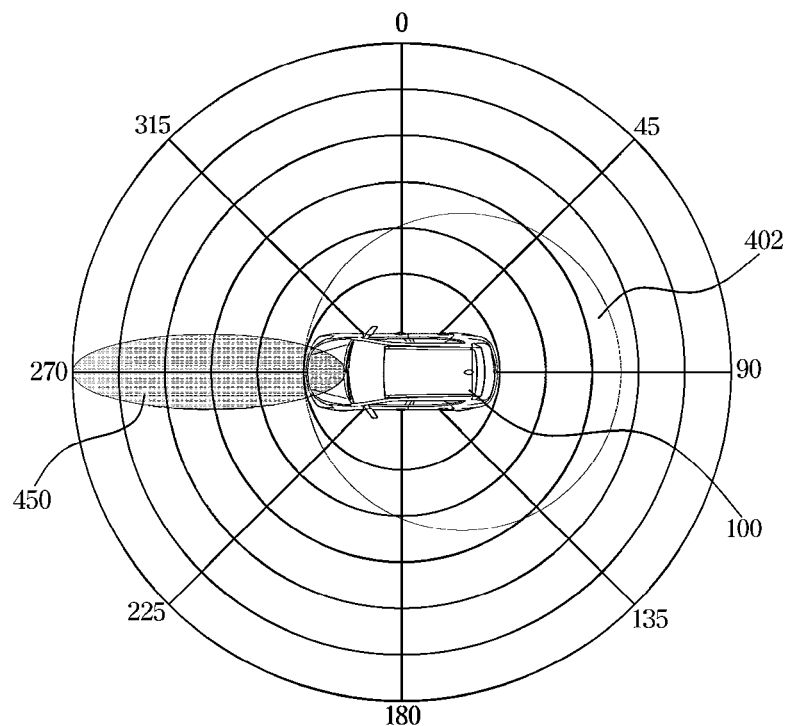
FIG. 4A and FIG. 4B are illustrative views showing one example of radiation patterns of a first antenna and a second antenna of a vehicle according to an exemplary embodiment of the present disclosure.
Figure 4B:
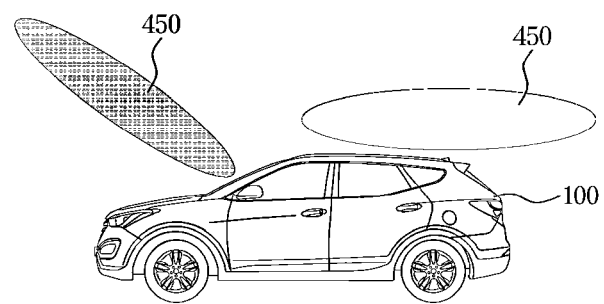

FIG. 4A and FIG. 4B are illustrative views showing an example of radiation patterns of a first antenna and a second antenna of a vehicle according to an exemplary embodiment of the present disclosure. In FIG. 4A and FIG. 4B, the radiation pattern is related to signal reception sensitivity in a communication situation. Reference numeral 410 of FIG. 4A and FIG. 4B indicates the signal reception sensitivity formed by each of the first antenna 350 and the second antenna 102 of the vehicle 100 according to the exemplary embodiment of the present disclosure, which is shown a plan view. Furthermore, reference numeral 420 in FIG. 4A and FIG. 4B indicates signal reception sensitivity formed by each of the first antenna 350 and the second antenna 102 of the vehicle 100 according to the exemplary embodiment of the present disclosure, which is shown in a side view.

As shown in FIG. 4A and FIG. 4B, the signal reception sensitivity, such as indicated by reference numeral 450, is formed in front of the vehicle 100 by the first antenna 350 provided in the wiper 120 of the vehicle 100 according to the exemplary embodiment of the present disclosure. Furthermore, the signal reception sensitivity, such as indicated by reference numeral 402, is formed around the rear of the vehicle 100 by the second antenna 102 provided on the rear roof of the vehicle 100 according to the exemplary embodiment of the present disclosure.

As shown in FIG. 4A and FIG. 4B, the signal reception sensitivity 402 formed by the second antenna 102 is formed relatively wider at the rear of the vehicle 100, rather than forming the same sensitivity in all directions around the vehicle 100. Accordingly, the signal reception sensitivity in the front of the vehicle 100 may be relatively weak.

As described above, in the vehicle 100 according to the exemplary embodiment of the present disclosure, the first antenna 350 is further provided on the wiper 120 in the front of the vehicle 100. As may be seen from the signal reception sensitivity 450 of the first antenna 350 shown in FIG. 4A and FIG. 4B, the signal reception sensitivity of the first antenna 350 compensates for an insufficient front signal reception sensitivity (based on a vehicle direction) of the second antenna 102. The first antenna 350 according to the exemplary embodiment of the present disclosure may be a directional antenna for securing the signal reception sensitivity as shown in FIG. 4.

In terms of an autonomous driving and a connected car, it is very important to communicate with other vehicles (or pedestrians) around the vehicle 100. Therefore, when the signal reception sensitivity of the antenna is biased toward the rear of the vehicle 100 as shown in the signal reception sensitivity 402 in FIG. 4A and FIG. 4B, communication with other vehicles (or pedestrians) located in front of the vehicle 100 may not be smooth. However, according to the exemplary embodiment of the present disclosure, the signal reception sensitivity 450 is formed in front of the vehicle 100 by the first antenna 350 to compensate for the insufficient front signal reception sensitivity of the signal reception sensitivity 402, so that an effective signal reception sensitivity may be formed in both the front and rear of the vehicle.

Figure 5A:
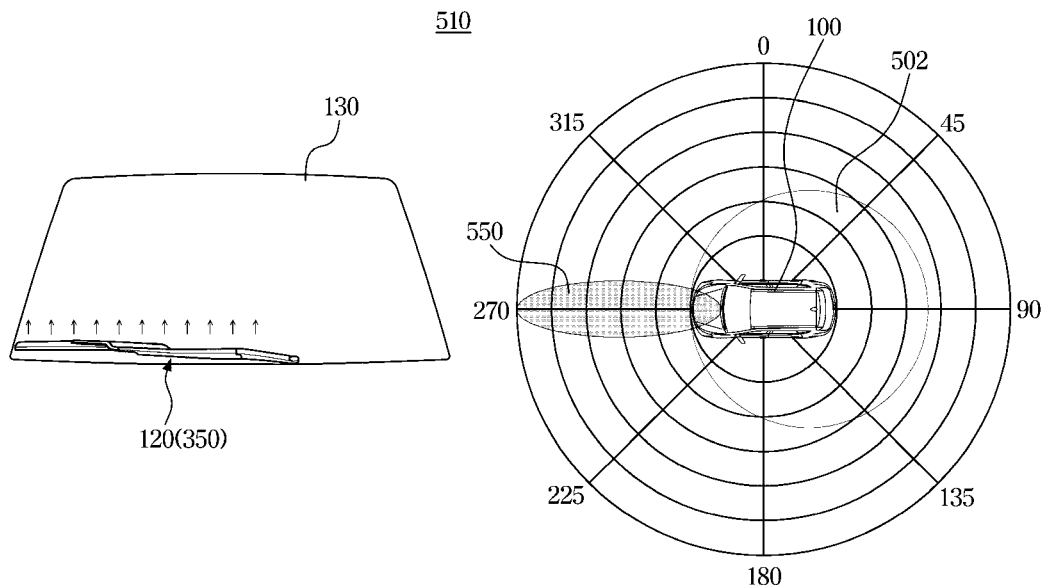
FIG. 5A and FIG. 5B are illustrative views showing another example of radiation patterns of a first antenna and a second antenna of a vehicle according to an exemplary embodiment of the present disclosure.
Figure 5B:
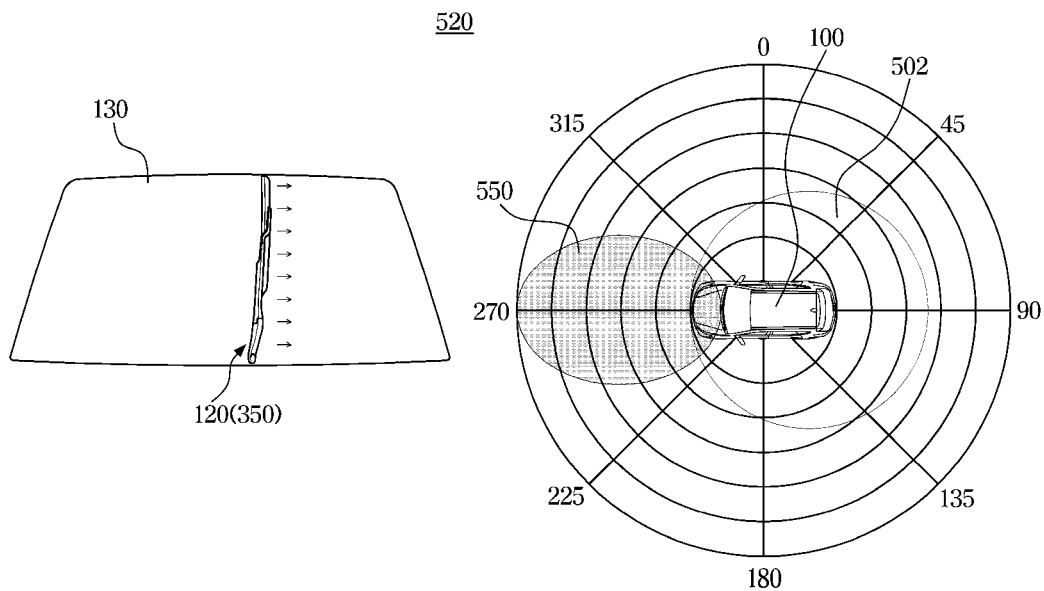

FIG. 5A and FIG. 5B are illustrative views showing another example of radiation patterns of a first antenna and a second antenna of a vehicle according to an exemplary embodiment of the present disclosure. The radiation pattern of FIG. 5A and FIG. 5B is related to the signal reception sensitivity in a communication situation. In FIG. 5A and FIG. 5B, reference numeral 510 indicates the signal reception sensitivity formed by each of the first antenna 350 and the second antenna 102 when the wiper 120 of the vehicle 100 according to the exemplary embodiment of the present disclosure is in an approximately horizontal direction. Furthermore, in FIG. 5A and FIG. 5B, reference numeral 520 indicates the signal reception sensitivity formed by each of the first antenna 350 and the second antenna 102 when the wiper 120 of the vehicle 100 according to the exemplary embodiment of the present disclosure is in an approximately vertical direction. Herein, each of the horizontal and vertical directions of the wiper 120 is the same as horizontal and vertical directions of the vehicle 100. In other words, when not in operation, a state (position) of the wiper 120 as shown in 510 of FIG. 5A and FIG. 5B is a basic state (position). When in operation, the wiper 120 reciprocates the state (position) of 510 and the state (position) of 520 of FIG. 5. Accordingly, in the exemplary embodiment of the present disclosure, the horizontal direction of the wiper 120 is the direction shown in 510 of FIG. 5A and FIG. 5B, and the vertical direction of the wiper 120 is the direction shown in 520 of FIG. 5A and FIG. 5B.

As shown in FIG. 5A and FIG. 5B, when the weather condition is raining or snowing, or when the windshield 130 of the vehicle 100 is contaminated, a driver of the vehicle 100 may operate the wiper 120 to remove rainwater, snow, and pollution. When the wiper 120 operates, the wiper 120 reciprocates the state (position) of 510 and the state (position) of 520 of FIG. 5. When the wiper 120 is in the horizontal direction, signal reception sensitivity 550 of the first antenna 350 has the same shape as shown in 510 of FIG. 5A and FIG. 5B. When the wiper 120 is in the vertical direction, the signal reception sensitivity 550 of the first antenna 350 has the same shape as shown in 520 of FIG. 5.

In rainy or a snowy conditions, radio wave attenuation may be caused by water vapor in the atmosphere absorbing radio waves. As described above, the first antenna 350 of the vehicle 100 according to the exemplary embodiment of the present disclosure is provided on the wiper 120. Accordingly, when the wiper 120 operates in rainy or snowy conditions, displacement of the first antenna 350 occurs due to the operation of the wiper 120, causing the first antenna 350 as shown in 520 of FIG. 5A and FIG. 5B to increase in signal reception sensitivity 550. Accordingly, increase in the signal reception sensitivity 550 at the first antenna 350 compensates for radio wave attenuation in rainy or snowy conditions, resulting in achieving effective signal reception.

As is apparent from the above, the exemplary embodiments of the present disclosure may improve communication stability with other target vehicles by securing sufficient signal reception sensitivity of the antenna of the vehicle even in rainy weather where the signal reception sensitivity of the antenna may decrease, while at the same time supplementing shortcomings of the short communication distance.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle, comprising:
a wiper including a blade configured to wipe a windshield of the vehicle and an arm supporting the blade; and
a first antenna provided on the arm of the wiper,
wherein the first antenna is in a form of a waveguide including a cross-section, an H-plane, and an E-plane.

2. The vehicle of claim 1, wherein the first antenna is a directional antenna configured to secure signal reception sensitivity in a same direction as a longitudinal direction of the vehicle toward in front of the vehicle.

3. The vehicle of claim 1, wherein a plurality of slots is formed on the H-plane of the first antenna.

4. The vehicle of claim 3,
wherein a size of each of the slots and a spacing between adjacent slots among the slots are ½ of a wavelength λ of a signal to be received through the first antenna, and
wherein a distance between a central point of a first slot disposed adjacent to one end portion of the first antenna among the plurality of slots and the one end portion of the first antenna is ¼ of the wavelength λ.

5. The vehicle of claim 1, further including a second antenna provided at a rear of the vehicle.

6. The vehicle of claim 5, wherein the first antenna and the second antenna are for Vehicle to Everything (V2X) communication.

7. A vehicle, comprising:
a wiper including a blade configured to wipe a windshield of the vehicle and an arm supporting the blade;
a first antenna provided on the arm of the wiper, wherein the first antenna is in a form of a waveguide including a cross-section, an H-plane, and an E-plane; and
a second antenna provided at a rear of the vehicle.

8. The vehicle of claim 7, wherein the first antenna is a directional antenna configured to secure signal reception sensitivity in a same direction as a longitudinal direction of the vehicle toward in front of the vehicle.

9. The vehicle of claim 7, wherein a plurality of slots is formed on the H-plane of the first antenna.

10. The vehicle of claim 9, wherein a size of each of the slots and a spacing between adjacent slots among the slots are formed as ½ of a wavelength λ of a signal to be received through the first antenna; and
a distance between a central point of a first slot disposed adjacent to one end portion of the first antenna among the plurality of slots and the one end portion of the first antenna is formed as ¼ of the wavelength λ.

11. The vehicle of claim 7, wherein the first antenna and the second antenna are for Vehicle to Everything (V2X) communication.

12. A wiper for a vehicle, the wiper comprising:
a blade configured to wipe a windshield of the vehicle;
an arm supporting the blade; and
an antenna provided on the arm of the wiper,
wherein the antenna is in a form of a waveguide including a cross-section, an H-plane, and an E-plane.

13. The wiper of claim 12, wherein the antenna is a directional antenna configured to secure signal reception sensitivity in a same direction as a longitudinal direction of the vehicle toward in front of the vehicle.

14. The wiper of claim 12, wherein a plurality of slots is formed on the H-plane of the antenna.

15. The wiper of claim 14, wherein a size of each of the slots and a spacing between adjacent slots among the slots are ½ of a wavelength λ of a signal to be received through the antenna; and
a distance between a central point of a first slot adjacent to one end portion of the antenna among the plurality of slots and the one end portion of the antenna is ¼ of the wavelength λ.

16. The wiper of claim 15, wherein the antenna is for Vehicle to Everything (V2X) communication.

* * * * *